(12) United States Patent
Yamaichi

(10) Patent No.: US 9,423,770 B2
(45) Date of Patent: Aug. 23, 2016

(54) HOLOGRAPHIC IMAGING

(71) Applicant: EMPIRE TECHNOLOGY DEVELOPMENT LLC, Wilmington, DE (US)

(72) Inventor: Eiji Yamaichi, Tokyo (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 211 days.

(21) Appl. No.: 13/990,427

(22) PCT Filed: Nov. 13, 2012

(86) PCT No.: PCT/US2012/064737
§ 371 (c)(1),
(2) Date: May 30, 2013

(87) PCT Pub. No.: WO2014/077798
PCT Pub. Date: May 22, 2014

(65) Prior Publication Data
US 2014/0132998 A1 May 15, 2014

(51) Int. Cl.
*G03H 1/22* (2006.01)

(52) U.S. Cl.
CPC .......... *G03H 1/2294* (2013.01); *G03H 1/2286* (2013.01); *G03H 2001/2234* (2013.01);
(Continued)

(58) Field of Classification Search
CPC .......... G02B 27/0103; G02B 27/0944; G02B 27/2214; G03H 1/0252; G03H 1/0256; G03H 1/0272; H04N 13/0404; H04N 13/0409
USPC ............... 359/458, 459, 462–464, 893, 1–35
See application file for complete search history.

(56) References Cited

U.S. PATENT DOCUMENTS 3,868,513 A   2/1975   Gonser
4,447,128 A   5/1984   Ferrer
(Continued)

FOREIGN PATENT DOCUMENTS

JP      7015751 A        1/1995
JP      07015751 A   *   1/1995
JP      2011-017200 A    1/2011

OTHER PUBLICATIONS

Yamaichi, "Holography Television", JP07015751A, machine translation.*
(Continued)

*Primary Examiner* — Bumsuk Won
*Assistant Examiner* — Wen Huang
(74) *Attorney, Agent, or Firm* — Ren-Sheng International

(57) ABSTRACT

Technologies are generally described for generating a holographic image on a transparent screen such that a user can view another scenery image though the screen along with the generated holographic image. Example devices may include an ultraviolet light irradiation unit configured to irradiate an ultraviolet light towards a hologram generating unit. The holographic generating unit may be configured to generate a hologram image in response to the received ultraviolet light. Further, the light irradiation unit and the hologram generating unit may be operable to project the hologram image onto a transparent screen coated with a photochromic material. The light transmittance of the photochromic material coated on the transparent screen may change when a light beam with a specific frequency range is irradiated on the photochromic material. The example device may further include a hologram reconstruction light source configured to irradiate a hologram reconstruction light on the transparent screen.

30 Claims, 9 Drawing Sheets

(52) U.S. Cl.
CPC ............ *G03H2001/2284* (2013.01); *G03H 2001/2292* (2013.01); *G03H 2222/15* (2013.01); *G03H 2260/52* (2013.01)

(56) References Cited

U.S. PATENT DOCUMENTS

| | | | |
|---|---|---|---|
| 6,468,699 B2* | 10/2002 | Lahrichi | 430/1 |
| 6,906,836 B2 | 6/2005 | Parker et al. | |
| 2001/0046630 A1 | 11/2001 | Toshine et al. | |
| 2007/0097472 A1* | 5/2007 | Ha | 359/35 |
| 2007/0211319 A1* | 9/2007 | Tomida | 359/3 |
| 2011/0002020 A1* | 1/2011 | Khan | 359/22 |

OTHER PUBLICATIONS

Eiji Yamaichi et al., "Optical Quenching of Photocurrent in KTaO3 Doped with Fe", Japanese Journal of Applied Physics, Jul. 1984, pp. 867-870, vol. 23, No. 7.

Yasmine Jackson et al., "Photo-Thermo-Refractive Glass", Optical Engineering, Jul. 11, 2009, pp. 1-9. Also available at <URL: http://coedpages.uncc.edu/cstem/summer%20ventures/2010%20Optical%20Engineering/PTR%20Yasmine%20Andrew%20Carmeron.pdf>.

Luke Westaway, "Samsung Smart Window Video Shows off Futuristic Fenestration", [online] CNET UK, Jan. 11, 2012. <retrieved on May 16, 2013>, Retrieved from the Internet at <URL: http://crave.cnet.co.uk/gadgets/samsung-smart-window-video-shows-off-futuristic-fenestration-50006626/>.

"Holographic Window for the L'Oréal Boot at the KNMP Fair", Youtube, Uploaded on Oct. 30, 2008. <retrieved on May 16, 2013>, Retrieved from the Internet at <URL: http://www.youtube.com/watch?v=NXD01GVUnWY> .

"Hologram Window Display in France by Adidas", Youtube, Uploaded on Dec. 2, 2008. <retrieved on May 16, 2013>, Retrieved from the internet at <URL: http://www.youtube.com/watch?v=DUp_LkcI0bM>.

Notification of Transmittal of the International Search Report and the Written Opinion of the International Searching Authority, PCT/US2012/064737, Jan. 25, 2013.

* cited by examiner

HOLOGRAPHIC IMAGING

CROSS-REFERENCE TO RELATED APPLICATION

The present application is a U.S. national stage filing under 35 U.S.C. §371 of International Application PCT/US2012/064737, filed on Nov. 13, 2012 and entitled "HOLOGRAPHIC IMAGING." The International Application, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

Holography techniques can be used to reproduce two-dimensional and three-dimensional images in a holographic imaging system. In such a holographic imaging system, a hologram can be displayed on a screen or a display panel such as high-definition LCD (liquid crystal display) panel constituted of pixels having a resolution of the order of the optical diffraction limit. For example, the hologram may be formed by irradiating a hologram reconstruction light, e.g., coherent light emitted from a laser light source that readily causes interference on fringe patterns displayed on one side of the display panel. The irradiation of the hologram reconstruction light on the fringe patterns may cause diffraction in the fringe patterns, such that a user can observe the diffracted light as holographic images.

Windows in a building such as a house may function as a passage through which sunlight can enter from the outside and also can allow a resident to view the outdoor scenery. Considering this function of the windows, a window-opening image display system has been proposed, where a window-opening image projection device displays an artificial scenery image in an opening of a window. This system may allow the resident to feel like viewing natural scenery through the window even in a case where the outdoor scenery cannot be viewable.

However, in the above-described window-opening image display system, an image is projected onto a roll screen arranged at the indoor side of the window, which blocks sunlight from entering the indoor side and thus makes any real outdoor scenery unviewable by the resident. Also, the image projected onto the roll screen is reconstructed as a two-dimensional scene, which makes the reality of the reconstructed image deteriorated.

SUMMARY

Technologies are generally described for generating a holographic image on a transparent screen through which a user can view another scenery image along with the generated holographic image.

Various example apparatus or devices described herein may include an ultraviolet light irradiation unit and a holographic generating unit. The ultraviolet light irradiation unit may be configured to irradiate an ultraviolet light. The hologram generating unit may be configured to receive the ultraviolet light and generate a hologram image in response to the received ultraviolet light. The light irradiation unit and the hologram generating unit may be operable to project the hologram image onto a transparent screen coated with a photochromic material.

In some examples, holographic imaging systems are described. The example systems may include an ultraviolet light irradiation unit, a transparent screen, and a hologram generating unit. The ultraviolet light irradiation unit may be configured to irradiate an ultraviolet light. The hologram generating unit may be configured to receive the ultraviolet light and generate a hologram image in response to the received ultraviolet light. The light irradiation unit and the hologram generating unit may be operable to project the hologram image onto a transparent screen. The transparent screen may be coated with a photochromic material such as potassium tantalate ($KTaO_3$), strontium titanate ($SrTiO_3$), or barium titanate ($BaTiO_3$), doped with an impurity such as nickel (Ni) or iron (Fe).

In some examples, methods for generating a holographic image are described. The example methods may include irradiating, by an ultraviolet light irradiation unit, an ultraviolet light, and generating, by a hologram generating unit, a hologram image in response to the ultraviolet light such that the hologram image is projected onto a transparent screen coated with a photochromic material. The example methods may further include irradiating, by a hologram reconstruction light source, a hologram reconstruction light on the transparent screen.

In some examples, computer-readable storage mediums are described that may be adapted to store a program operable by a holographic imaging device to configure the holographic imaging device to carry out holographic image generation. The holographic imaging device may include various features as further described herein. The program may include one or more instructions for irradiating, by an ultraviolet light irradiation unit, an ultraviolet light, and generating, by a hologram generating unit, a hologram image in response to the ultraviolet light such that the hologram image is projected onto a transparent screen coated with a photochromic material. The program may further include one or more instructions for irradiating, by a hologram reconstruction light source, a hologram reconstruction light on the transparent screen.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
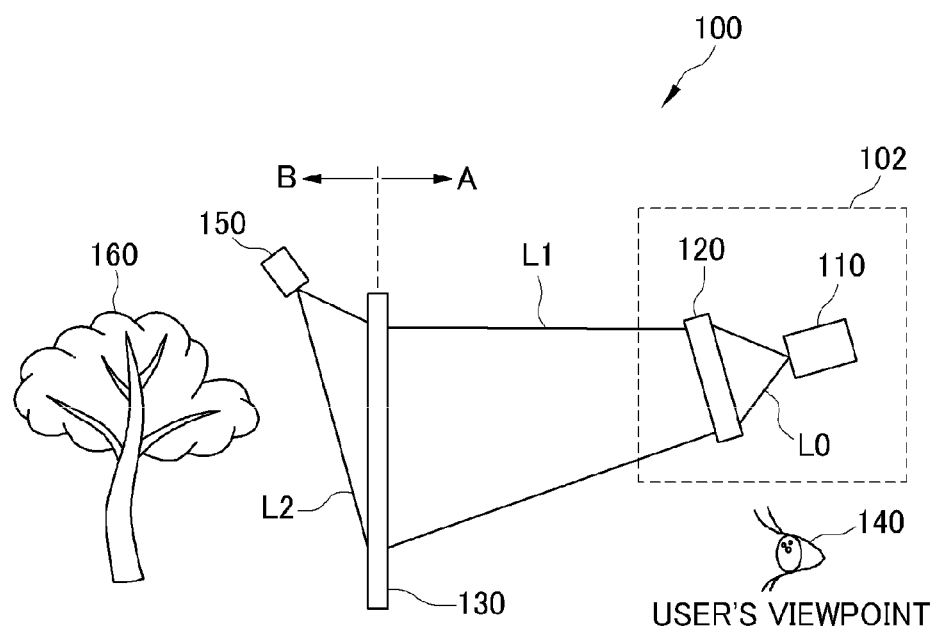
FIG. 1 schematically shows an illustrative example holographic imaging system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to generating a holographic image on a transparent screen through which a user can view another scenery image along with the generated holographic image.

Briefly stated, technologies are generally described for generating a holographic image on a transparent screen, such that a user can view another scenery image superimposed on the generated holographic image through the transparent screen. Example holographic imaging devices may include an ultraviolet light irradiation unit configured to irradiate an ultraviolet light towards a hologram generating unit. The holographic generating unit may be configured to generate a hologram image in response to the received ultraviolet light. Further, the ultraviolet light irradiation unit and the hologram generating unit may be operable to project the hologram image onto a transparent screen coated with a photochromic material. The light transmittance of the photochromic material coated on the transparent screen may change when a light beam with a specific frequency range is irradiated on the photochromic material. Thus, holograms may be formed on the transparent screen by changing a visible light transmittance of the photochromic material in response to varying intensities of the ultraviolet light. The example holographic imaging devices may further include a hologram reconstruction light source configured to irradiate a hologram reconstruction light on the transparent screen.

In some embodiments, the ultraviolet light irradiation unit may include a light source configured to irradiate a light towards an ultraviolet light passing filter, such that a light with an ultraviolet frequency bandwidth is irradiated from the filter. Also, the light source may be a mercury vapor lamp or a Xenon arc lamp.

In some embodiments, the hologram generating unit may include a quartz glass plate coated with a photosensitive material in which holograms are pre-recorded in accordance with any suitable hologram-recording method. Alternatively, the hologram generating unit may include a transparent LCD (liquid crystal display) panel coated with a quartz glass. The transparent LCD display panel may be configured to receive an image signal and generate the hologram image based on the image signal.

In some embodiments, the transparent screen may include a transparent plate such as a glass plate coated with the photochromic material. Alternatively, the transparent screen may include a transparent LED (light-emitting diode) display panel coated with the photochromic material. For example, the photochromic material may include at least one of potassium tantalite. ($KTaO_3$), strontium titanate ($SrTiO_3$), or barium titanate ($BaTiO_3$), doped with an impurity such as nickel (Ni) or iron (Fe).

FIG. 1 schematically shows an illustrative example holographic imaging system 100, arranged in accordance with at least some embodiments described herein. As depicted, holographic imaging system 100 may include a holographic imaging device 102, a transparent screen 130, and a hologram reconstruction light source 150.

In some embodiments, hologram imaging device 102 may be configured to generate a hologram image and project the generated hologram image onto transparent screen 130 by means of an ultraviolet light L1. Transparent screen 130 may include a transparent material, such as a glass material or a transparent LED display panel, coated with a photochromic material. The light transmittance of the photochromic material coated on the transparent material may change when a light beam with a specific energy range, such as ultraviolet light L1 with energy level of about 3.5 eV to about 5 eV irradiated by hologram imaging device 102. Specifically, on transparent screen 130 coated with the photochromic material having the above-described characteristics, holograms may be formed by changing the light transmittance of the photochromic material in response to the varying intensities (e.g., about $7.5 \times 10^{12}$ photons/$cm^2 \cdot sec$ or more) of ultraviolet light L1.

In some embodiments, hologram reconstruction light source 150 may be configured to generate a hologram reconstruction light L2, such as a visible laser beam, and irradiate generated hologram reconstruction light L2 onto transparent screen 130. When the holograms formed on transparent screen 130 are irradiated with hologram reconstruction light L2, images of an object represented by the holograms may be reconstructed and viewable by a user 140. In FIG. 1, by way of example, hologram reconstruction light source 150 may be arranged at a side B opposing to a side A of transparent screen 130 where ultraviolet light L1 from holographic imaging device 102 is irradiated. However, in some other embodiments, hologram reconstruction light source 150 may be arranged at side A of transparent screen 130, such that both ultraviolet light L1 and hologram reconstruction light L2 may be irradiated on same side A of transparent screen 130.

As illustrated in FIG. 1, user 140 may view a scenery image including a real-world object 160, such as a tree, through transparent screen 130. Thus, user 140 can view real-world object 160 superimposed on the hologram images reconstructed on transparent screen 130. In some instances, transparent screen 130 may be installed on an inner side of a window in a building, such that an outside scenery and/or external sunlight can be viewable by user 140 while he/she is watching hologram images reconstructed on transparent screen 130.

In some embodiments, holographic imaging device 102 may include an ultraviolet light irradiation unit 110 and a hologram generating unit 120. Ultraviolet light irradiation unit 110 may be configured to transmit an ultraviolet light L0. Further, hologram generating unit 120 may be configured to receive ultraviolet light L0 from ultraviolet light irradiation unit 110 and generate a hologram image in response to received ultraviolet light L0. In this manner, ultraviolet light irradiation unit 110 and hologram generating unit 120 may be operable to project the generated hologram image onto transparent screen 130 by means of ultraviolet light L1.

Figure 2:
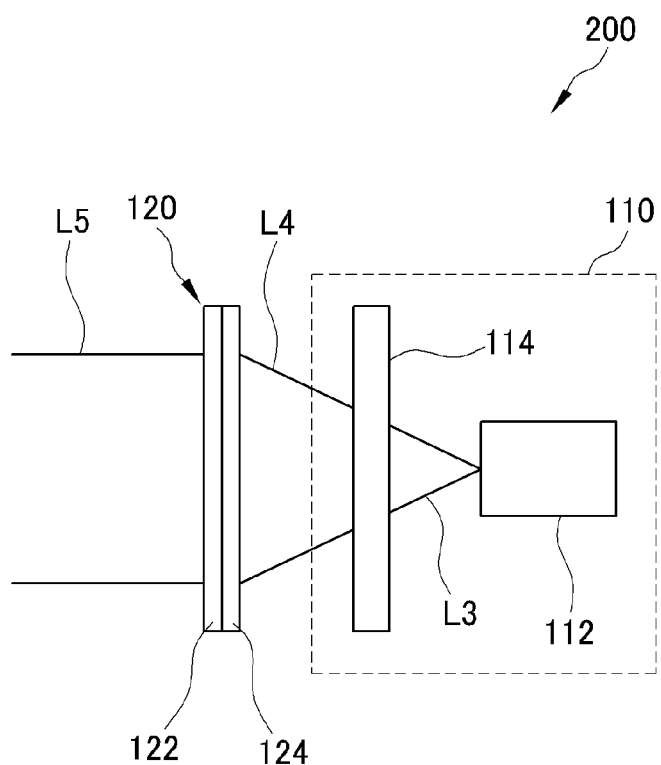
FIG. 2 schematically shows an illustrative example holographic imaging device.

FIG. 2 schematically shows an illustrative example holographic imaging device 200, arranged in accordance with at least some embodiments described herein. Holographic imaging device 200 may be used in holographic imaging system 100 as shown in FIG. 1, in place of holographic imaging device 102.

As depicted, an ultraviolet light irradiation unit 110 of holographic imaging device 200 may include a light source 112 configured to generate and transmit a light beam L3 towards an ultraviolet light passing filter 114, such as a nickel sulfate (NiSO$_4$) solution filter, an UVD-33S filter, or a combination thereof, where the ultraviolet light passing filter 114 is configured to pass an ultraviolet light L4 (which may correspond to a portion of the light from incident beam L3) such that ultraviolet light L4 can be transmitted from ultraviolet light irradiation unit 110. In some embodiments, light source 112 may be implemented using a mercury vapor lamp, a high-pressure mercury lamp, or a Xenon arc lamp.

Further, ultraviolet light L4 from ultraviolet light irradiation unit 110 may be transmitted onto hologram generation unit 120. In some embodiments, hologram generation unit 120 may include a thin film in which holograms are pre-recorded according to any suitable hologram-recording methods. In this configuration, when ultraviolet light L4 passes through the thin film, the recorded holograms can be projected by means of ultraviolet light L5 irradiated from the thin film. For example, as illustrated in FIG. 2, hologram generation unit 120 may include a thin transparent plate 122 such as a quartz glass plate, on which a hologram recording material 124 such as a photosensitive material is coated. A hologram of an object may be pre-recorded on hologram recording material 124 by irradiating a laser beam on the object, such that an object beam scattered from the object and a reference laser beam can be irradiated onto hologram recording material 124 to record the hologram therein.

In some embodiments, hologram imaging device 200 as shown in FIG. 2 may be utilized in place of hologram imaging device 102 of holographic imaging system 100, for the purpose of generating still hologram images because hologram generating unit 120 may store pre-recorded holograms in hologram recording material 124. Alternatively, hologram generating unit 120 may be configured in a different manner such that hologram generating unit 120 may receive and/or generate variable hologram images such as moving pictures of an object.

Figure 3:
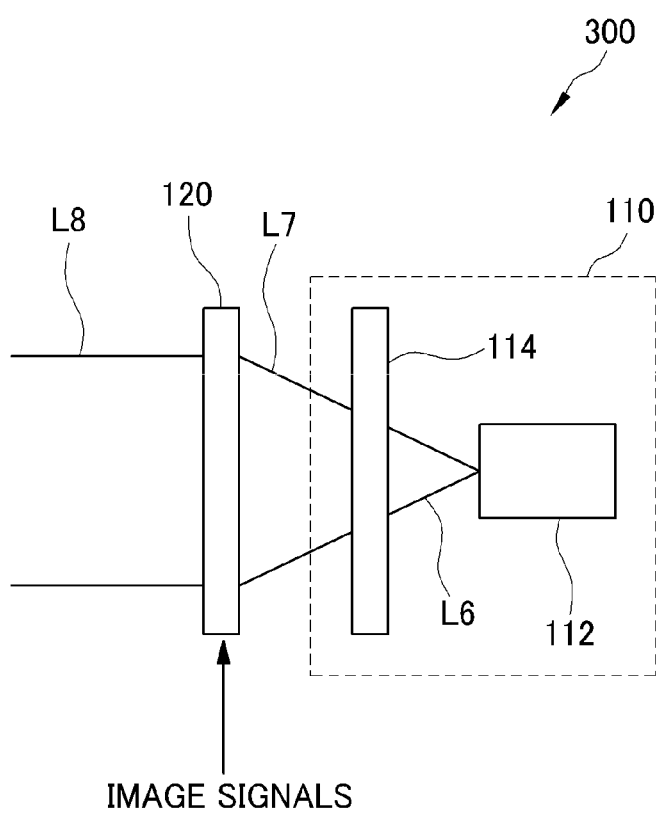
FIG. 3 schematically shows another illustrative example holographic imaging device.

FIG. 3 schematically shows another illustrative example holographic imaging device 300, arranged in accordance with at least some embodiments described herein. Holographic imaging device 300 may be used in holographic imaging system 100 as shown in FIG. 1, in place of holographic imaging device 102.

As shown, an ultraviolet light irradiation unit 110 of holographic imaging device 300 may include a light source 112 configured to generate and transmit a light beam L6 towards an ultraviolet light passing filter 114, such as a nickel sulfate (NiSO$_4$) solution filter, an UVD-33S filter, or a combination thereof, where the ultraviolet light passing filter 114 is configured to pass an ultraviolet light L7 (which may correspond to a portion of the light from incident beam L6) such that ultraviolet light L7 can be transmitted from ultraviolet light irradiation unit 110. In some embodiments, light source 112 may be implemented using a mercury vapor lamp, a high-pressure mercury lamp, or a Xenon arc lamp. Further, ultraviolet light L7 from ultraviolet light irradiation unit 110 may be irradiated onto hologram generation unit 120.

In some embodiments, hologram generation unit 120 may include a transparent display panel, such as a transparent LCD panel, configured to generate holograms images based on image signals, which may be input from an external device or an internal storage device (not shown). Either side of transparent display panel 120 may be coated with a transparent material such as a quartz glass. In this configuration, when ultraviolet light L7 passes through transparent display panel 120, the generated hologram images can be projected by means of ultraviolet light L8 irradiated from transparent display panel 120.

In some embodiments, the image signals received by hologram generation unit 120 may represent holograms of moving objects or various static objects. Thus, hologram imaging device 300 as shown in FIG. 3 may be used in a holographic imaging system, such as holographic imaging system 100 of FIG. 1, for the purpose of generating hologram images variable depending on the received image signals.

Figure 4:
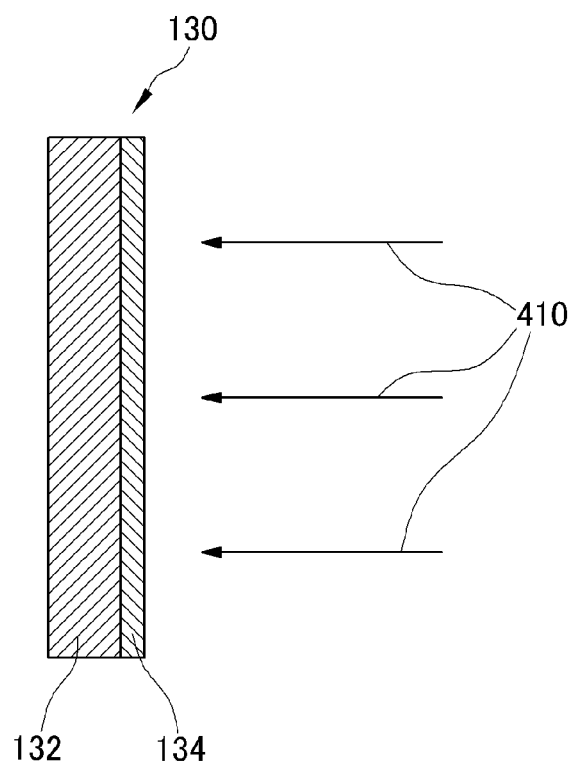
FIG. 4 schematically shows a cross-sectional view of an illustrative example transparent screen.

FIG. 4 schematically shows a cross-sectional view of an illustrative example transparent screen 130, arranged in accordance with at least some embodiments described herein. As illustrated, transparent screen 130 may include a transparent plate 132, such as a glass plate or a transparent LED display panel, coated with a photochromic material 134. As described above, the light transmittance of photochromic material 134 coated on transparent plate 132 may change when a light beam with a specific energy range, such as an ultraviolet light 410 with energy level of about 3.5 eV to about 5 eV irradiated by hologram imaging device 102, 200 or 300. Holograms may be formed on transparent screen 130 coated with photochromic material 134 having the above-described characteristics, by changing the light transmittance of photochromic material 134 in response to the varying intensities (e.g., about $7.5 \times 10^{12}$ photons/cm$^2$·sec or more) of ultraviolet light 410.

In some embodiments, photochromic material 134 may include one or more of a crystalline, polycrystalline, or amorphous materials including potassium (K), strontium (Sr), barium (Ba), tantalum (Ta), and/or titanium (Ti). For example, photochromic material 134 may include at least one of potassium tantalate (KTaO$_3$), strontium titanate (SrTiO$_3$), or barium titanate (BaTiO$_3$), doped with an impurity such as nickel (Ni) or iron (Fe), which may be represented by KTaO$_3$:Fe, KTaO$_3$:Ni, SrTiO$_3$:Fe, SrTiO$_3$:Ni, BaTiO$_3$:Fe, or BaTiO$_3$:Ni. Additionally or alternatively, photochromic material 134 may include an organic photochromic material such as HABI (hexaarylbiimidazole).

Figure 5A:
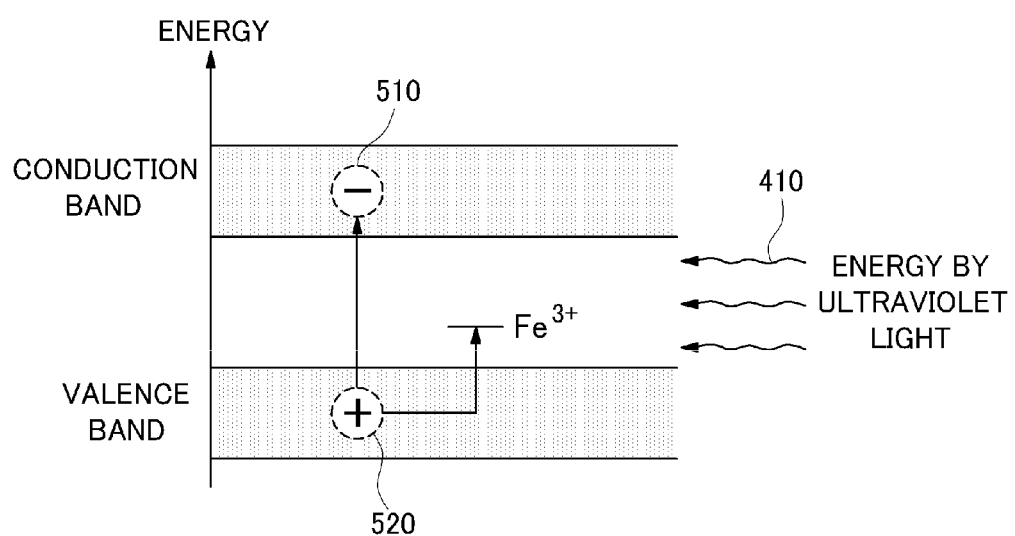
FIGS. 5A and 5B illustrate an electronic band structure of a photochromic material used in an illustrative example transparent screen.
Figure 5B:
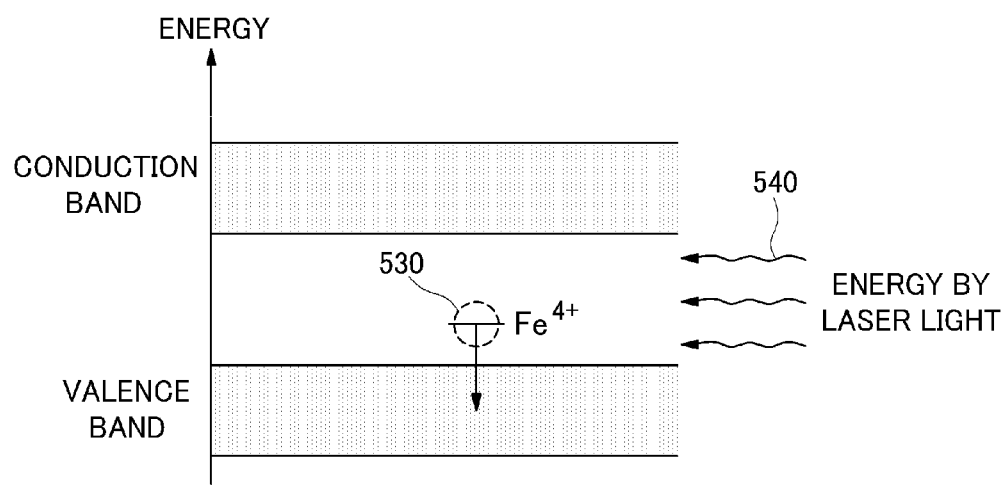

FIGS. 5A and 5B illustrate an electronic band structure of a photochromic material 134 used in an illustrative example transparent screen 130, arranged in accordance with at least some embodiments described herein. As depicted in FIG.

5A, when ultraviolet light 410 (which may representing hologram images) is irradiated on photochromic material 134, such as $KTaO_3$:Fe, $SrTiO_3$:Fe, $BaTiO_3$:Fe, an electron 510 in the irradiated portion of photochromic material 134 may be excited by energy of ultraviolet light 410, and may move from the valence band to the conduction band of photochromic material 134, thus forming a hole 520 in the valence band. Hole 520 formed in the valence band may be trapped by a trivalent impurity $Fe^{3+}$, which changes $Fe^{3+}$ to $Fe^{4+}$.

Further, photochromic material 134 in the above-described state may exhibit wide absorption characteristics for a light with visible spectrum and may specifically have a light absorption peak at the wavelength of about 440 nm or about 630 nm. Thus, as illustrated in FIG. 5B, when a light beam 540 such as a laser light beam having a wavelength of about 440 nm or about 630 nm, $Fe^{4+}$ may excite a hole 530 in the valence band in response to energy by light beam 540.

Accordingly, on photochromic material 134 of transparent screen 130, a hologram that exhibits variation in transmittance for visible light with a specific wavelength, such as about 440 nm or about 630 nm, may be formed in accordance with the intensity variation of an ultraviolet light such as ultraviolet light L1, L5 or L8 irradiated from holographic imaging device 102, 200 or 300. Further, when the hologram formed on transparent screen 130 is irradiated with a hologram reconstruction light with the specific wavelength, such as hologram reconstruction light L2 from hologram reconstruction light source 150, a holographic image may be reconstructed and viewable by user 140.

As explained above, photochromic material 134 may exhibit light transmittance at the specific wavelength (e.g., about 440 nm or about 630 nm) variable in response to irradiation of an ultraviolet light, whereas the light transmittance at other wavelengths may remain substantially unchanged. Thus, user 140 can view a scenery image such as an outdoor scenery image including real-world object 160 superimposed on the hologram image formed on transparent screen 130.

Figure 6:
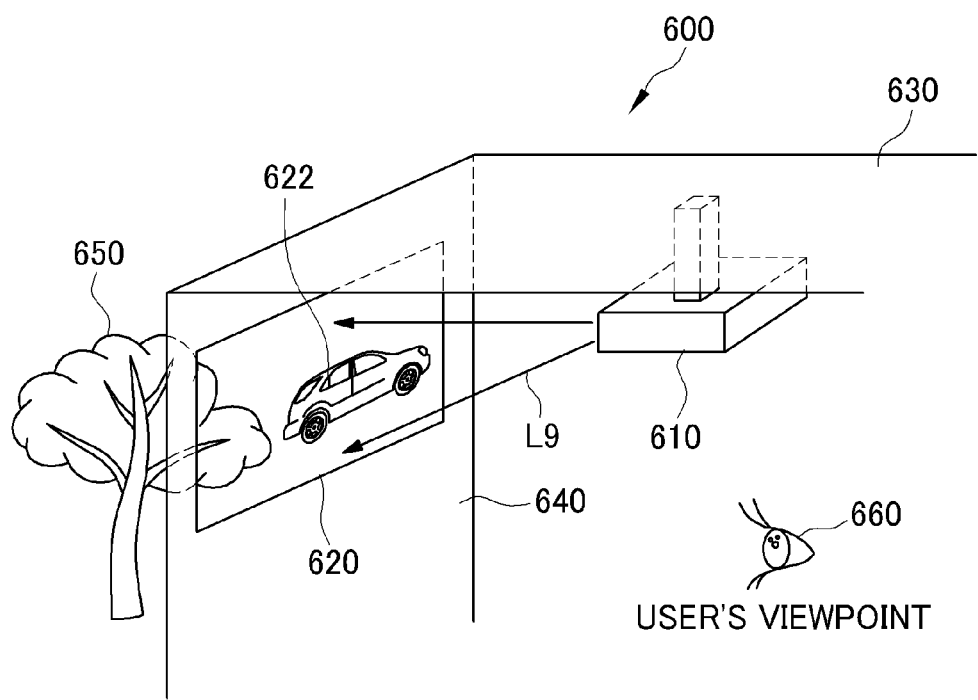
FIG. 6 schematically shows another illustrative example holographic imaging system.

FIG. 6 schematically shows another illustrative example holographic imaging system 600, arranged in accordance with at least some embodiments described herein. As depicted, holographic imaging system 600 may include a holographic imaging device 610 attached to a ceiling 630 of a building, and a transparent screen 620 installed at an inner side of a wall 640 such that transparent screen 620 overlaps at least a portion of a window through which an outdoor scenery including a real-world object 650 such as a tree is viewable.

In some embodiments, hologram imaging device 610 may be configured to generate a hologram image and project the generated hologram image onto transparent screen 620 by means of an ultraviolet light L9. Transparent screen 620 may include a transparent material, such as a glass material or a transparent LED display panel, coated with a photochromic material. As discussed above, the light transmittance of the photochromic material coated on the transparent material may change when a light beam with a specific frequency range, such as ultraviolet light L9 irradiated from hologram imaging device 610.

In some embodiments, hologram imaging device 610 may be further configured to generate a hologram reconstruction light such as a visible laser beam, and irradiate the generated hologram reconstruction light onto transparent screen 620. When holograms formed on transparent screen 620 are irradiated with the hologram reconstruction light, images 622 of an object represented by the holograms may be reconstructed and viewable by a user 660. Thus, as illustrated in FIG. 6, user 660 can view the outdoor scenery image including real-world object 650 superimposed on hologram image 622 reconstructed on transparent screen 620.

Figure 7:
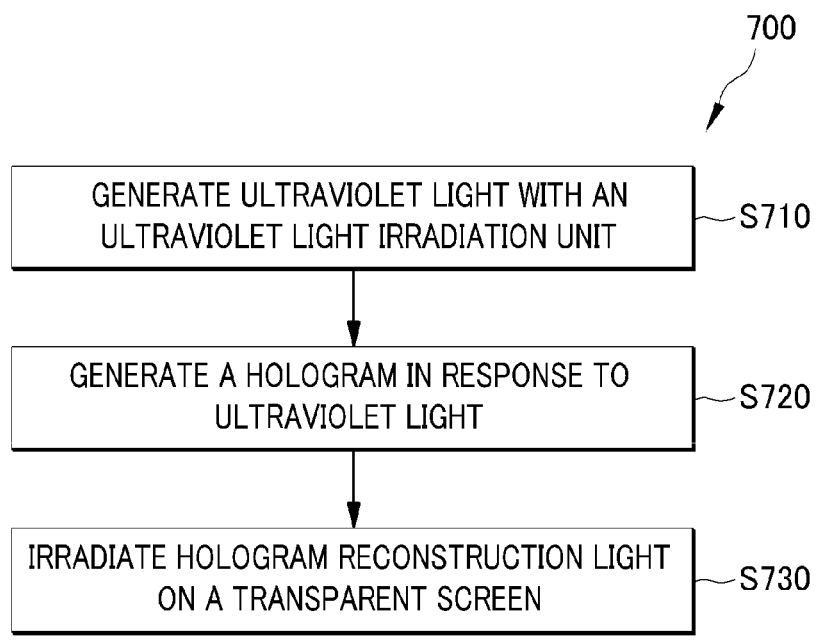
FIG. 7 shows an example flowchart of a method adapted to generate holographic images in a holographic imaging device or a holographic imaging system.

FIG. 7 shows an example flowchart of a method adapted to generate holographic images in a holographic imaging device or a holographic imaging system, in accordance with at least some embodiments described herein. An example method 700 in FIG. 7 may be implemented using, for example, a holographic imaging system such as holographic imaging system 100 or 600, a holographic imaging device such as holographic imaging device 102, 200, 300 or 610, or any suitable computing device including a processor adapted to generate holographic images.

Method 700 may include one or more operations, actions, or functions as illustrated by one or more of blocks S710, S720 and/or S730. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 700 may begin at block S710, "GENERATE ULTRAVIOLET LIGHT WITH AN ULTRAVIOLET LIGHT IRRADIATION UNIT."

At block S710, an ultraviolet light may be generated, such as by an ultraviolet light irradiation unit. As depicted in FIGS. 1 to 3, ultraviolet light irradiation unit 110 of holographic imaging device 102, 200, or 300 may generate an ultraviolet light beam that is transmitted towards the hologram generating unit 120. In some embodiments, ultraviolet light irradiation unit 110 may include light source 112 configured to generate a light beam that is transmitted towards ultraviolet light passing filter 114, where the ultraviolet light passing filter 114 can pass at least a portion of the ultraviolet light from ultraviolet light irradiation unit 110. Block S710 may be followed by block S720, "GENERATE A HOLOGRAM IN RESPONSE TO ULTRAVIOLET LIGHT."

At block S720, a hologram may be generated in response to the ultraviolet light received from the ultraviolet light irradiation unit, such as by the hologram generating unit. As illustrated in FIGS. 1 to 3, hologram generating unit 120 may receive the ultraviolet light from ultraviolet light irradiation unit 110 and generate a hologram image in response to the received ultraviolet light. In this manner, ultraviolet light irradiation unit 110 and hologram generating unit 120 may be operable to project the generated hologram image onto transparent screen 130.

In some embodiments, hologram generation unit 120 may include a thin film in which holograms can be pre-recorded according to any suitable hologram recording methods. In this configuration, when the ultraviolet light passes through the thin film, the recorded holograms can be projected by means of the ultraviolet light irradiated from the thin film. In some other embodiments, hologram generation unit 120 may include a transparent display panel such as a transparent LCD panel, configured to generate holograms images based on image signals, which may be input from an external device or an internal storage device. Either side of the transparent display panel may be coated with a transparent material such as a quartz glass. In this configuration, when the ultraviolet light passes through the transparent display panel, the generated hologram images may be projected by means of the ultraviolet light irradiated from the transparent display panel. The image signals received by hologram generation unit 120 may represent holograms of moving objects or various static objects. Block S720 may be followed by block S730, "IRRADIATE HOLOGRAM RECONSTRUCTION LIGHT ON A TRANSPARENT SCREEN."

At block S730, a hologram reconstruction light may be irradiated on the transparent screen, such as by a hologram reconstruction light source. As illustrated in FIG. 1, hologram reconstruction light source 150 may generate a hologram reconstruction light such as a visible laser beam, and irradiate the generated hologram reconstruction light onto transparent screen 130. When the holograms formed on transparent screen 130 are irradiated with the hologram reconstruction light, images of an object represented by the holograms may be reconstructed and viewable by a user. As illustrated in FIG. 1, user 140 may view a scenery image including real-world object 160 superimposed on the hologram images reconstructed on transparent screen 130.

In light of the present disclosure, one skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
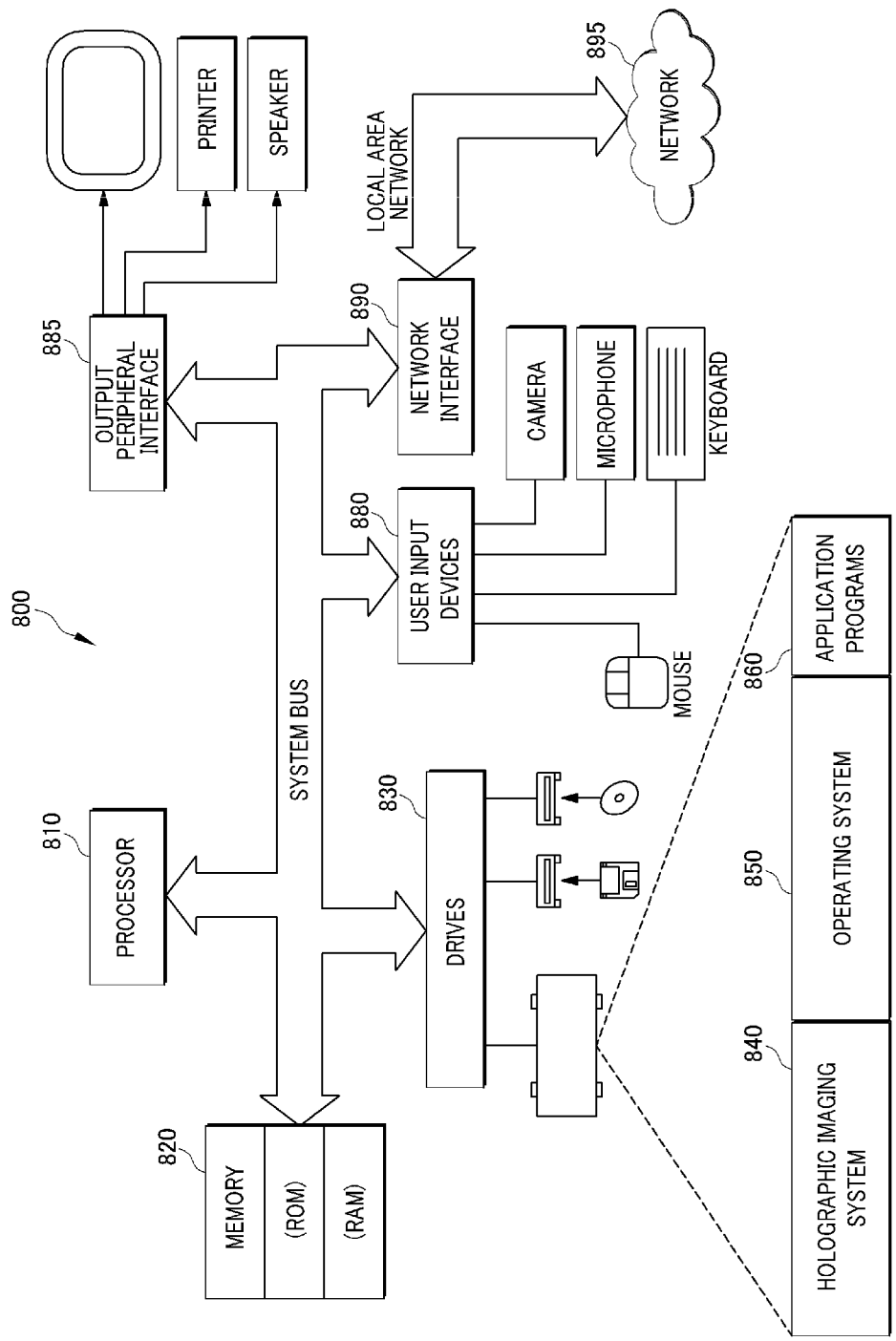
FIG. 8 shows a schematic block diagram illustrating an example computing system that may be configured to perform a method for generating holographic images in a holographic imaging device or a holographic imaging system.

FIG. 8 shows a schematic block diagram illustrating an example computing system that may be configured to perform a method for generating holographic images in a holographic imaging device or a holographic imaging system, arranged in accordance with at least some embodiments described herein. As depicted in FIG. 8, a computer 800 may include a processor 810, a memory 820 and one or more drives 830. Computer 800 may be implemented as a conventional computer system, an embedded control computer, a laptop, or a server computer, a mobile device, a set-top box, a kiosk, a vehicular information system, a mobile telephone, a customized machine, or other hardware platform.

Drives 830 and their associated computer storage media may provide storage of computer readable instructions, data structures, program modules and other data for computer 800. Drives 830 may include a holographic imaging system 840, an operating system (OS) 850, and application programs 860. Holographic imaging system 840 may be adapted to control a holographic imaging device such as holographic imaging device 102, 200, 300 or 610 to generate holographic images. Additionally, holographic imaging system 840 may be adapted to control the holographic imaging device in such a manner as described above with respect to FIGS. 1, 2, 3 and 6.

Computer 800 may further include user input devices 880 through which a user may enter commands and data. Input devices may include an electronic digitizer, a camera, a microphone, a keyboard and pointing device, commonly referred to as a mouse, trackball or touch pad. Other input devices may include a joystick, game pad, satellite dish, scanner, or the like.

These and other input devices may be coupled to processor 810 through a user input interface that is coupled to a system bus, but may be coupled by other interface and bus structures, such as a parallel port, game port or a universal serial bus (USB). Computers such as computer 800 may also include other peripheral output devices such as display devices, which may be coupled through an output peripheral interface 885 or the like.

Computer 800 may operate in a networked environment using logical connections to one or more computers, such as a remote computer coupled to a network interface 890. The remote computer may be a personal computer, a server, a router, a network PC, a peer device or other common network node, and may include many or all of the elements described above relative to computer 800.

Networking environments are commonplace in offices, enterprise-wide area networks (WAN), local area networks (LAN), intranets, and the Internet. When used in a LAN or WLAN networking environment, computer 800 may be coupled to the LAN through network interface 890 or an adapter. When used in a WAN networking environment, computer 800 typically includes a modem or other means for establishing communications over the WAN, such as the Internet or a network 895. The WAN may include the Internet, the illustrated network 895, various other networks, or any combination thereof. It will be appreciated that other mechanisms of establishing a communications link, ring, mesh, bus, cloud, or network between the computers may be used.

In some embodiments, computer 800 may be coupled to a networking environment. Computer 800 may include one or more instances of a physical computer-readable storage medium or media associated with drives 830 or other storage devices. The system bus may enable processor 810 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or nonvolatile memory technology. The media may also represent secondary storage, whether implemented as storage drives 830 or otherwise. Hard drive implementations may be characterized as solid state, or may include rotating media storing magnetically encoded information.

Processor 810 may be constructed from any number of transistors or other circuit elements, which may individually or collectively assume any number of states. More specifically, processor 810 may operate as a state machine or finite-state machine. Such a machine may be transformed to a second machine, or specific machine by loading executable instructions. These computer-executable instructions may transform processor 810 by specifying how processor 810 transitions between states, thereby transforming the transistors or other circuit elements constituting processor 810 from a first machine to a second machine. The states of either machine may also be transformed by receiving input from user input devices 880, network interface 890, other peripherals, other interfaces, or one or more users or other actors. Either machine may also transform states, or various physical characteristics of various output devices such as printers, speakers, video displays, or otherwise.

Figure 9:
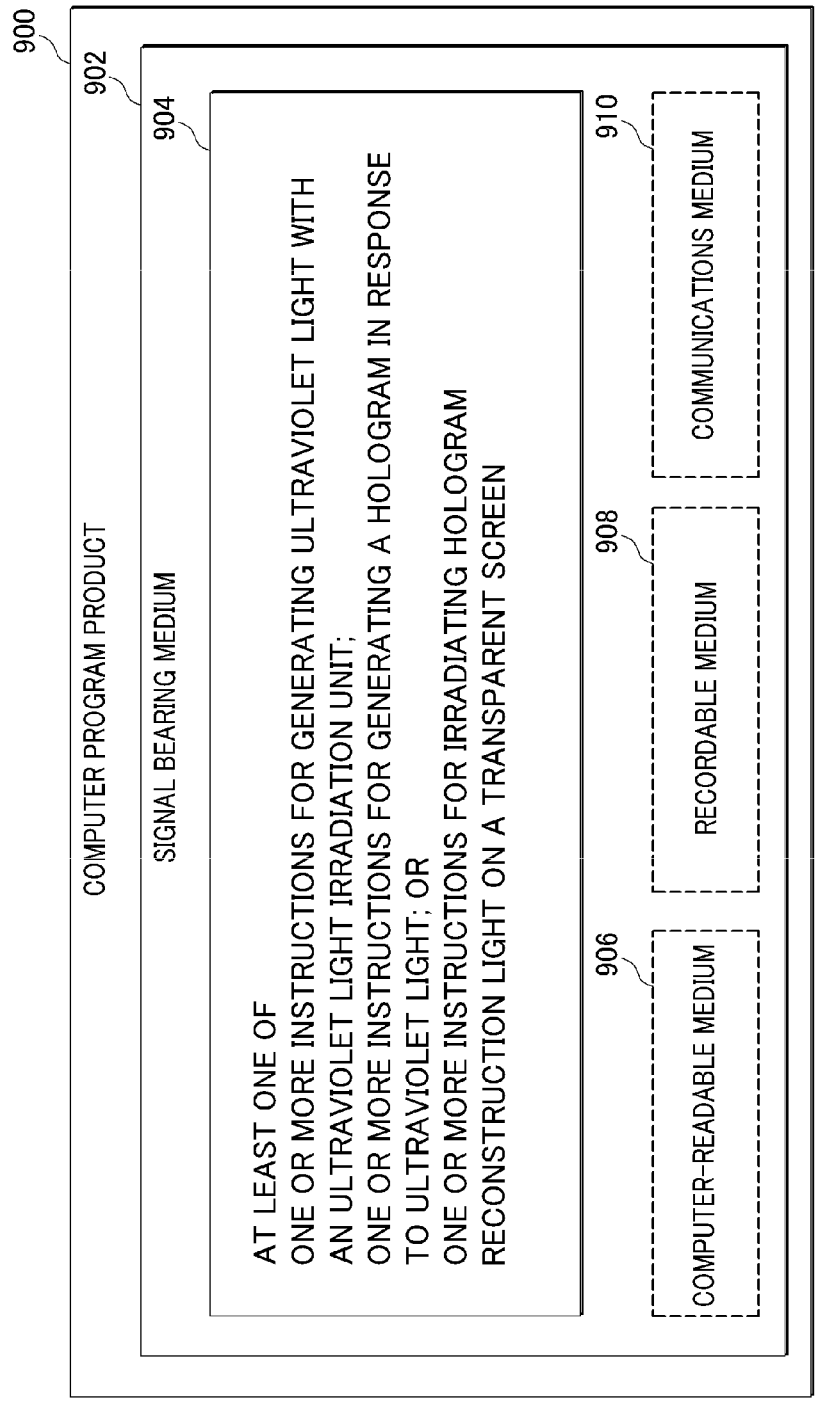
FIG. 9 illustrates a computer program product that may be utilized to generate holographic images in a holographic imaging device or a holographic imaging system, all arranged in accordance with at least some embodiments described herein.

FIG. 9 illustrates a computer program product 900 that may be utilized to operate a holographic imaging device or a holographic imaging system in accordance with at least some embodiments described herein. Computer program product 900 may include a signal bearing medium 902. Signal bearing medium 902 may include one or more instructions 904 that, when executed by, for example, a processor, may provide the functionality described above with respect to FIGS. 1, 2, 3 and 6. By way of example, instructions 904 may include: one or more instructions for generating ultraviolet light with an ultraviolet light irradiation unit; one or more instructions for generating a hologram in response to ultraviolet light; or one or more instructions for irradiating hologram reconstruction light on a transparent screen. Thus, for example, referring to FIGS. 1, 2, 3 and 6, holographic imaging device 102, 200, 300 or 610 or holographic imaging system 100 or 600 may undertake one or more of the blocks shown in FIG. 7 in response to instructions 904.

In some implementations, signal bearing medium 902 may encompass a computer-readable medium 906, such as, but not limited to, a hard disk drive, a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, computer program product 900 may be conveyed to one or more modules of holographic imaging device 102, 200, 300 or 610 or holographic imaging system 100 or 600 by an RF signal bearing medium 902, where signal bearing medium 902 is conveyed by a wireless communications medium 910 (e.g., a wireless communications medium conforming with the IEEE 802.11 standard).

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, apparatus, systems, devices, and computer program products, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A holographic imaging device, comprising:
   an ultraviolet light irradiation unit configured to irradiate a first ultraviolet light; and
   a hologram generation unit including a transparent material configured to receive the first ultraviolet light and generate a hologram image by a second ultraviolet light irradiated from the transparent material, wherein the ultraviolet light irradiation unit and the hologram generation unit are operable to project the hologram image onto a transparent screen that is coated with a photochromic material and that is located at a projection distance away from the hologram generation unit.

2. The holographic imaging device of claim 1, wherein the ultraviolet light irradiation unit comprises a light source and an ultraviolet light passing filter.

3. The holographic imaging device of claim 2, wherein the light source comprises a mercury vapor lamp or a Xenon arc lamp.

4. The holographic imaging device of claim 1, wherein the transparent material is a quartz glass plate coated with a photosensitive material pre-recorded with a hologram.

5. The holographic imaging device of claim 1, wherein the transparent material is coated on a transparent liquid crystal display (LCD) panel and is a quartz glass.

6. The holographic imaging device of claim 5, wherein the transparent LCD panel is configured to receive an image signal representative of a hologram and generate the hologram image based on the image signal.

7. The holographic imaging device of claim 1, wherein the transparent screen comprises a glass plate coated with the photochromic material.

8. The holographic imaging device of claim 7, wherein the photochromic material comprises one or more materials selected from a group consisting of $KTaO_3$:Fe, $KTaO_3$:Ni, $SrTiO_3$:Fe, $SrTiO_3$:Ni, $BaTiO_3$:Fe and $BaTiO_3$:Ni.

9. The holographic imaging device of claim 1, wherein the transparent screen comprises a transparent LED (light-emitting diode) display panel coated with the photochromic material.

10. The holographic imaging device of claim 9, wherein the photochromic material comprises one or more materials selected from the group consisting of $KTaO_3$:Fe, $KTaO_3$:Ni, $SrTiO_3$:Fe, $SrTiO_3$:Ni, $BaTiO_3$:Fe and $BaTiO_3$:Ni.

11. A holographic imaging system, comprising:
    an ultraviolet light irradiation unit configured to irradiate a first ultraviolet light;
    a transparent screen coated with a photochromic material;
    a hologram generation unit including a transparent material configured to receive the first ultraviolet light and generate a hologram image by a second ultraviolet light irradiated from the transparent material, wherein the ultraviolet light irradiation unit and the hologram generation unit are operable to project the hologram image onto the transparent screen that is coated with the photochromic material and which is located at a projection distance away from the hologram generation unit; and
    a hologram reconstruction light source configured to irradiate a hologram reconstruction light onto the transparent screen.

12. The holographic imaging system of claim 11, wherein the ultraviolet light irradiation unit comprises a light source and an ultraviolet light passing filter.

13. The holographic imaging system of claim 12, wherein the light source comprises a mercury vapor lamp or a Xenon arc lamp.

14. The holographic imaging system of claim 11, wherein the transparent material is a quartz glass plate coated with a photosensitive material pre-recorded with a hologram.

15. The holographic imaging system of claim 11, wherein the transparent material is coated on a transparent liquid crystal display (LCD) panel and is a quartz glass.

16. The holographic imaging system of claim 15, wherein the transparent LCD panel is configured to receive an image signal representative of a hologram and generate the hologram image based on the image signal.

17. The holographic imaging system of claim 11, wherein the transparent screen comprises a glass plate coated with the photochromic material.

18. The holographic imaging system of claim 17, wherein the photochromic material comprises one or more materials selected from a group consisting of $KTaO_3$:Fe, $KTaO_3$:Ni, $SrTiO_3$:Fe, $SrTiO_3$:Ni, $BaTiO_3$:Fe and $BaTiO_3$:Ni.

19. The holographic imaging system of claim 11, wherein the transparent screen comprises a transparent LED display panel coated with the photochromic material.

20. The holographic imaging system of claim 19, wherein the photochromic material comprises one or more materials selected from the group consisting of $KTaO_3$:Fe, $KTaO_3$:Ni, $SrTiO_3$:Fe, $SrTiO_3$:Ni, $BaTiO_3$:Fe and $BaTiO_3$:Ni.

21. A method to generate a holographic image, comprising:
    irradiating, by an ultraviolet light irradiation unit, a first ultraviolet light; and
    generating, by a hologram generation unit having a transparent material, a hologram image in response to the first ultraviolet light such that the hologram image is projected onto a transparent screen by a second ultraviolet light irradiated from the transparent material, wherein the transparent screen is coated with a photochromic material and is located at a projection distance away from the hologram generation unit.

22. The method of claim 21, further comprising irradiating, by a hologram reconstruction light source, a hologram reconstruction light onto the transparent screen.

23. The method of claim 21, wherein the irradiating comprises irradiating, by a light source and an ultraviolet light passing filter, the first ultraviolet light.

24. The method of claim 21, wherein the transparent material is a quartz glass plate coated with a photosensitive material pre-recorded with a hologram.

25. The method of claim 21, further comprising receiving, by a transparent liquid crystal display (LCD) panel coated with the transparent material, which is a quartz glass, an image signal representative of a hologram and generating the hologram image based on the image signal.

26. A non-transitory computer-readable storage medium which stores a program operable by a holographic imaging device to generate holographic images, the program comprising one or more instructions to perform or cause to be performed:
    irradiating, by an ultraviolet light irradiation unit, a first ultraviolet light; and
    generating, by a hologram generation unit having a transparent material, a hologram image in response to the first ultraviolet light such that the hologram image is projected onto a transparent screen by a second ultraviolet light irradiated from the transparent material, wherein the transparent screen is coated with a photochromic material and is located at a projection distance away from the hologram generation unit.

27. The non-transitory computer-readable storage medium of claim 26, wherein the program further comprises one or more instructions to perform or cause to be performed:
    irradiating, by a hologram reconstruction light source, a hologram reconstruction light on the transparent screen.

28. The non-transitory computer-readable storage medium of claim 26, wherein the irradiating comprises irradiating, by a light source and an ultraviolet light passing filter, the first ultraviolet light.

29. The non-transitory computer-readable storage medium of claim 26, wherein the transparent material is a quartz glass plate coated with a photosensitive material pre-recorded with a hologram.

30. The non-transitory computer-readable storage medium of claim 26, wherein the program further comprises one or more instructions to perform or cause to be performed:
    based on an image signal representative of a hologram received by a transparent liquid crystal display (LCD) panel coated with the transparent material, which is a quartz glass, generating the hologram image.

* * * * *